United States Patent
Nakamura et al.

(12) 
(10) Patent No.: US 6,833,409 B2
(45) Date of Patent: Dec. 21, 2004

(54) IMPACT MODIFIER, PROCESS FOR PRODUCING THE SAME, AND THERMOPLASTIC RESIN COMPOSITION CONTAINING THE SAME

(75) Inventors: Keiji Nakamura, Otake (JP); Masakazu Ito, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 34 days.

(21) Appl. No.: 10/257,405

(22) PCT Filed: Apr. 20, 2001

(86) PCT No.: PCT/JP01/03390
§ 371 (c)(1),
(2), (4) Date: Oct. 21, 2002

(87) PCT Pub. No.: WO01/81465
PCT Pub. Date: Nov. 1, 2001

(65) Prior Publication Data
US 2003/0114588 A1 Jun. 19, 2003

(30) Foreign Application Priority Data
Apr. 20, 2000 (JP) ........................................ 2000-119879
Apr. 20, 2000 (JP) ........................................ 2000-120008

(51) Int. Cl.⁷ ........................ C08L 51/04; C08F 265/06; C08F 265/04
(52) U.S. Cl. ............................ 525/71; 525/80; 525/85; 525/227; 525/228; 525/309; 523/201
(58) Field of Search .............................. 525/71, 80, 85, 525/227, 228, 309; 523/201

(56) References Cited

U.S. PATENT DOCUMENTS

| | | |
|---|---|---|
| 4,041,108 A | 8/1977 | Shoji et al. |
| 4,564,653 A | 1/1986 | Kamata et al. |
| 5,942,581 A | 8/1999 | Nakamura et al. |
| 6,486,234 B1 | 11/2002 | Nakamura et al. |
| 6,545,089 B1 * | 4/2003 | DeRudder et al. ............ 525/63 |

FOREIGN PATENT DOCUMENTS

| | | |
|---|---|---|
| EP | 0 488 799 | 6/1992 |
| JP | 63-258944 | 10/1988 |
| JP | 2000-026552 | 1/2000 |
| JP | 2000-344841 | 12/2000 |
| WO | WO 00/04092 | 1/2000 |

OTHER PUBLICATIONS

"Surface Active Agent Industry", No. 4, 1999 (with English Abstract).

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

An impact strength modifier comprises an acrylic rubber graft copolymer (I) obtained by graft-polymerizing a polyalkyl (meth)acrylate composite rubber (A) with a vinyl monomer (B), and a compound (II) which has a sulfonic acid group or a sulfuric acid group and also has two or more benzene ring skeletons, or a salt thereof. The polyalkyl (meth)acrylate composite rubber (A) contains two or more acrylic rubber components each having a different glass transition temperature, and the respective acrylic rubber components have 20% by weight or less of a monomer having two or more unsaturated bonds in a molecule. The compound (II) preferably has two or more benzene ring skeletons, and a particle size distribution of the polyalkyl (meth)acrylate composite rubber (A) is preferably a polydisperse distribution in which two or more peaks exist within a specific range. When using the impact strength modifier of the present invention, the impact resistance, particularly low-temperature impact resistance of the resin can be improved in a small amount and weatherability such as fading resistance or impact resistance of the resulting molded article can be satisfactorily maintained.

17 Claims, 1 Drawing Sheet

IMPACT MODIFIER, PROCESS FOR PRODUCING THE SAME, AND THERMOPLASTIC RESIN COMPOSITION CONTAINING THE SAME

TECHNICAL FIELD

The present invention relates to an impact strength modifier which can impart excellent weatherability, particularly fading resistance and impact resistance, and relates to a thermoplastic resin composition containing the same.

This application is based on Japanese Patent Applications Nos. 2000-119879 and 2000-120008, filed in Japan, the content of which is incorporated herein by reference.

BACKGROUND ART

As means for improving the impact resistance of commodity thermoplastic resins such as methacrylic resin, polystyrene resin, acrylonitrile/styrene resin and polycarbonate, various publicly known techniques have been proposed.

For example, Japanese Patent Application, Second Publication No. Hei 4-325542B discloses a method of improving the appearance of a product while maintaining its impact resistance by adding a specific alcohol to a rubbery polymer latex. Also, Japanese Patent Application, First Publication No. Hei 10-101869A discloses a method of improving the impact resistance by using a graft copolymer obtained by graft-polymerizing a composite rubber having a structure, wherein an isobutylene polymer segment and a vinyl polymer segment are not mutually separated, with a vinyl monomer.

The vinyl chloride resin is the most versatile resin, but has a drawback such as poor impact resistance. To improve the impact resistance, various methods have been proposed and include, for example, a method of using a MBS resin, which is obtained by graft-polymerizing a butadiene rubbery polymer with methyl methacrylate, styrene or acrylonitrile, in combination with a vinyl chloride resin.

Although the impact resistance is improved by using the MBS resin in combination with the vinyl chloride resin, the weatherability is reduced and, furthermore, the impact resistance is drastically reduced when using the molded article outdoors.

It is believed that the weatherability is mainly reduced by ultraviolet deterioration of a butadiene unit constituting the MBS resin.

Therefore, Japanese Patent Application, Second Publication No. Sho 51-28117B proposes a method of improving the weatherability of the MBS resin and imparting impact resistance by graft-polymerizing a crosslinked alkyl (meth) acrylate rubber polymer comprising an alkyl (meth)acrylate and a crosslinking agent with methyl methacrylate, styrene or acrylonitrile.

However, according to the methods disclosed in Japanese Patent Application, Second Publication No. Hei 4-325542B and Japanese Patent Application, First Publication No. Hei 10-101869A, high impact resistance has never been achieved by improving the impact resistance of commodity thermoplastic resins such as methacrylic resin, polystyrene resin, acrylonitrile/styrene resin and polycarbonate.

According to the method of improving the impact resistance of a vinyl chloride resin using an acrylic graft copolymer disclosed in Japanese Patent Application, Second Publication No. Sho 51-28117B, the resulting molded article is superior in weatherability and reduction of the impact resistance is less likely to occur. However, there arose a problem in that a large amount of the acrylic graft copolymer must be added to yield the impact strength and the acrylic graft copolymer is inferior in the impact resistance-manifesting effect, particularly the impact resistance-manifesting effect at low temperature to the MBS resin.

DISCLOSURE OF THE INVENTION

An object of the present invention is to provide an impact strength modifier which can improve the impact resistance, particularly low-temperature impact resistance of the resin by adding it in a small amount and can satisfactorily maintain the weatherability such as fading resistance or impact resistance of the resulting molded article, and thermoplastic resin composition containing the same.

The impact strength modifier of the present invention comprises an acrylic rubber graft copolymer (I) obtained by graft-polymerizing a polyalkyl (meth)acrylate composite rubber (A) with a vinyl monomer (B), and a compound (II) which has a sulfonic acid group or a sulfuric acid group and also has two or more benzene ring skeletons, or a salt thereof, wherein the polyalkyl (meth)acrylate composite rubber (A) contains two or more acrylic rubber components each having a different glass transition temperature, and the respective acrylic rubber components have 20% by weight or less of a monomer having two or more unsaturated bonds in a molecule.

The impact strength modifier of the present invention comprises an acrylic rubber graft copolymer (I) obtained by graft-polymerizing a polyalkyl (meth)acrylate composite rubber (A) with a vinyl monomer (B), and a compound (II) which has a sulfonic acid group or a sulfuric acid group and also has two or more benzene ring skeletons, or a salt thereof, wherein the polyalkyl (meth)acrylate composite rubber (A) contains two or more acrylic rubber components each having a different glass transition temperature, the respective acrylic rubber components have 20% by weight or less of a monomer having two or more unsaturated bonds in a molecule, and a particle size distribution of the polyalkyl (meth)acrylate composite rubber (A) is a polydisperse distribution in which at least one peak exists within a range from 0.05 to 0.4 μm and a weight percentage within the range is from 50 to 99.9% by weight, and at least one peak exists within a range from 0.4 to 1.0 μm and a weight percentage within the range is from 0.1 to 50% by weight.

BEST MODE FOR CARRYING OUT THE INVENTION

Figure 1:
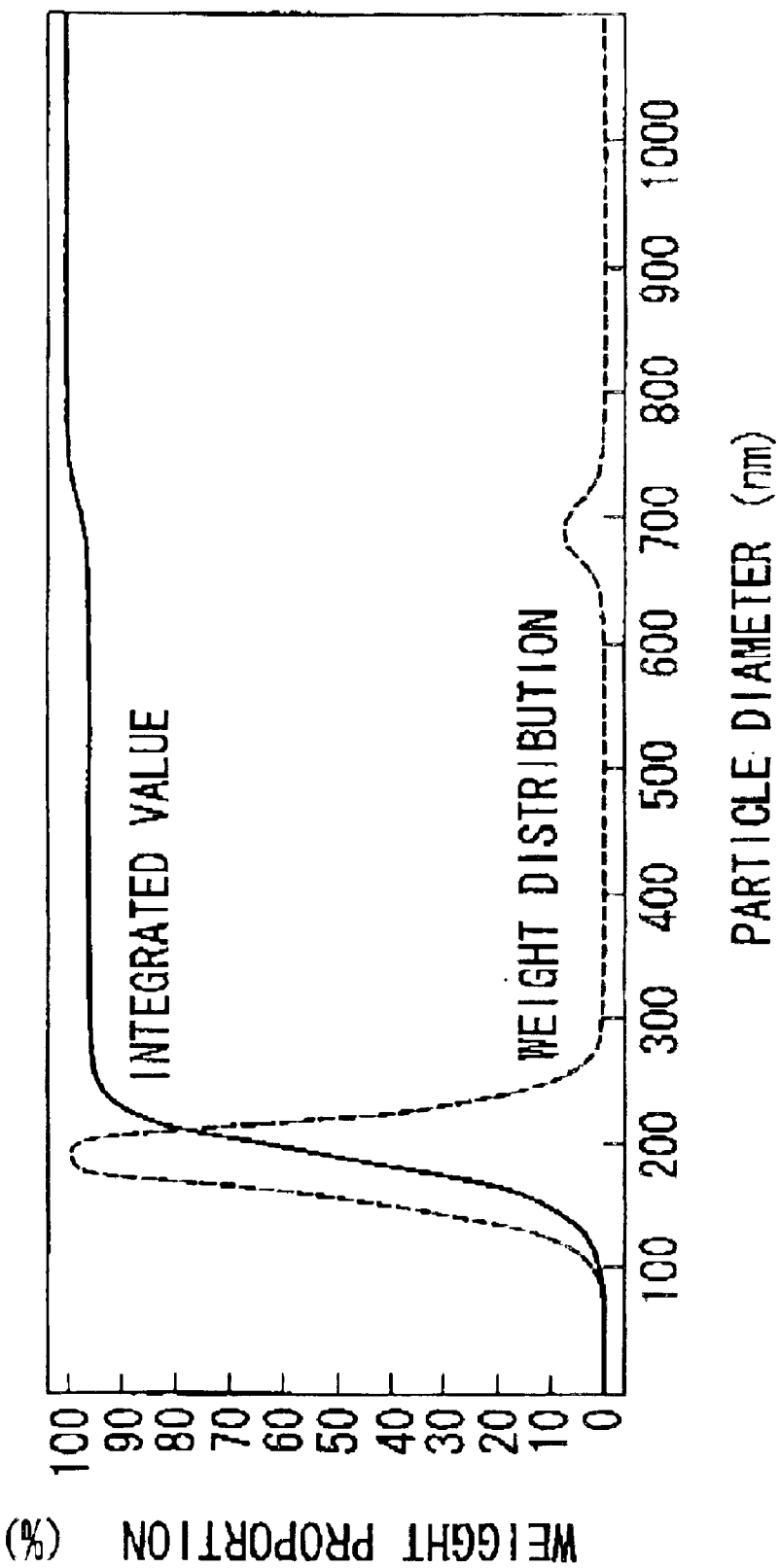
FIG. 1 is a graph showing a particle size distribution (weight distribution) of a polyalkyl (meth)acrylate rubber in an Example of the present invention.

The present invention will now be described in detail.

The impact strength modifier of the present invention contains an acrylic rubber graft copolymer (I) and the acrylic rubber graft copolymer (I) is obtained by graft-polymerizing a polyalkyl (meth)acrylate composite rubber (A) with a vinyl monomer (B).

The polyalkyl (meth)acrylate composite rubber (A) is a composite rubber containing two or more acrylic rubber components each having a different glass transition temperature. Each acrylic rubber component is obtained by polymerizing one or more monomers containing one or more alkyl (meth)acrylate.

The alkyl (meth)acrylate is not specifically limited and examples thereof include methyl acrylate, ethyl acrylate, n-propyl acrylate, n-butyl acrylate, 2-ethylhexyl acrylate, ethoxyethoxyethyl acrylate, methoxy tripropylene glycol acrylate, 4-hydroxybutyl acrylate, lauryl methacrylate and stearyl methacrylate. These alkyl (meth)acrylates are used alone, or two or more kinds thereof may be used in combination.

The monomers may contain a monomer having two or more unsaturated bonds in a molecule in a proportion of 20% by weight or less, and preferably within a range from 0.1 to 18% by weight. The monomer having two or more unsaturated bonds in a molecule serves as a crosslinking agent or a graft crosslinking agent and examples of the crosslinking agent include ethylene glycol dimethacrylate, propylene glycol dimethacrylate, 1,3-butylene glycol dimethacrylate, 1,4-butylene glycol dimethacrylate, divinyl benzene, and silicone such as polyfunctional methacryl group-modified silicone. Examples of the graft crosslinking agent include allyl methacrylate, triallyl cyanurate and triallyl isocyanurate. The allyl methacrylate can also be used as the crosslinking agent. These crosslinking agents and graft crosslinking agents are used alone, or two or more kinds thereof may be used in combination.

The monomer may further contain various vinyl monomers, for example, aromatic alkenyl compounds such as styrene, α-methylstyrene or vinyl toluene; a cyanated vinyl compound such as acrylonitrile or methacrylonitrile; and methacrylic acid-modified silicone and fluorine-containing vinyl compound in a proportion of 30% by weight or less.

The polyalkyl (meth)acrylate composite rubber (A) contains two or more kinds of the above acrylic rubber component and each of usable acrylic rubber components have a different glass transition temperature. The polyalkyl (meth)acrylate composite rubber (A) preferably has two or more glass transition temperatures at 10° C. or less and at least one glass transition temperature is preferably lower than a glass transition temperature of an n-butyl acrylate homopolymer. The polyalkyl (meth)acrylate composite rubber (A) having the glass transition temperature within the above range is preferred because the resulting impact strength modifier can impart better impact resistance.

The glass transition temperature of the polymer is measured as a transition point of tan d measured by a dynamic mechanical property analyzer (hereinafter abbreviated to DMA). In general, the polymer obtained from the monomer has an intrinsic glass transition temperature and one transition point is observed in case of being used alone (random copolymer of single component or plural components), while each intrinsic transition point is observed in the case of using a mixture of plural components, or a complexed polymer. In the case in which the polymer is composed of two components, two transition points can be observed by the measurement. In a tan d curve determined by DMA, two peaks are observed. However, in the case in which case two components are not blended in well-balanced composition ratio or have similar transition temperatures, the respective peaks are closer to each other and a peak having a shoulder portion is sometimes observed; however, the peak can be distinguished from a simple curve with a single peak as is observed in the case of a single component.

The glass transition temperature of the n-butyl acrylate homopolymer varies depending on the presence or absence and degree of crosslinking. As used herein, the phrase "at least one glass transition temperature is lower than the glass transition temperature of an n-butyl acrylate homopolymer" means that in the case in which a (meth)acrylate composite rubber (A) contains a component (a-1) containing n-butyl acrylate, the glass transition temperature of another component (a-2) is lower than the glass transition temperature of the component (a-1) containing n-butyl acrylate in the case of comparing the glass transition temperature of the component (a-1) alone with the glass transition temperature of another component (a-2) alone. In the case in which the polyalkyl (meth)acrylate composite rubber (A) contains no n-butyl acrylate, a homopolymer of n-butyl acrylate is prepared by replacing the monomer of each component by n-butyl acrylate. In the case in which it contains a crosslinking agent or a graft crosslinking agent, a homopolymer of n-butyl acrylate is prepared by equally setting a molar fraction thereof and the monomer to be crosslinked. Consequently, the above phrase means that in the case of comparing the glass transition temperature of the resulting homopolymer with the glass transition temperature of each component constituting polyalkyl (meth)acrylate, at least one glass transition temperature is lower than the glass transition temperature of the n-butyl acrylate homopolymer.

The polyalkyl (meth)acrylate composite rubber (A) is not specifically limited as long as it contains two or more acrylic rubber components each having a different glass transition temperature, but is preferably a polyalkyl (meth)acrylate composite rubber comprising an acrylic rubber (A1) component containing at least one kind selected from the group consisting of 2-ethylhexyl acrylate, ethoxyethoxyethyl acrylate, methoxy tripropylene glycol acrylate, 4-hydroxybutyl acrylate, lauryl methacrylate and stearyl methacrylate as a constituent component and an acrylic rubber (A2) component containing n-butyl acrylate as a constituent component because of excellent impact resistance, and more preferably a polyalkyl (meth)acrylate composite rubber wherein the acrylic, rubber (A1) component contains at least one among 2-ethylhexyl acrylate, lauryl methacrylate and stearyl methacrylate as a constituent component because of excellent impact resistance, particularly impact resistance at low temperature. When using stearyl methacrylate having crystallinity at around room temperature, the stearyl methacrylate is used in combination with a monomer which can dissolve it.

In this case, the glass transition temperature (Tg1) originating in the acrylic rubber (A1) component of the polyalkyl (meth)acrylate composite rubber (A) is preferably lower than the glass transition temperature (Tg2) originating in the acrylic rubber (A2) component because the impact resistance at low temperatures is superior.

When the polyalkyl (meth)acrylate composite rubber (A) is prepared from two kinds of acrylic rubber components, there can be used a method of polymerizing a monomer containing one or alkyl (meth)acrylates to obtain a first acrylic rubber latex, adding a monomer constituting a second acrylic rubber component in the acrylic rubber component latex, thereby to impregnate the acrylic rubber component latex therewith, and polymerizing the impregnated latex in the presence of a radical polymerization initiator. The polymerization gradually proceeds, thus yielding a latex of polyalkyl (meth)acrylate composite rubber (A) wherein two kinds of acrylic rubber component are complexed. Alternatively, the polyalkyl (meth)acrylate composite rubber can be prepared by a method of polymerizing by adding dropwise a second rubber in the presence of a first rubber or expanding a complexed rubber using an acid or a salt.

More preferably, the polyalkyl (meth)acrylate composite rubber (A) is obtained by emulsion-polymerizing a monomer containing n-butyl acrylate constituting the acrylic rubber (A2) component in the presence of the acrylic rubber (A1) component containing at least one kind selected from the group consisting of 2-ethylhexyl acrylate, ethoxyethoxyethyl acrylate, methoxy tripropylene glycol acrylate, 4-hydroxybutyl acrylate, lauryl methacrylate and stearyl methacrylate as a constituent component. The polymerization method is not specifically limited, but is usually an emulsion polymerization method, and optionally, a controlled emulsion polymerization method. In the polymerization of the A1 component used preferably in the present invention, a controlled emulsion polymerization is preferably used.

When using 2-ethyl acrylate, lauryl methacrylate or stearyl methacrylate as the monomer constituting the acrylic rubber (A1) component, the acrylic rubber (A1) component is preferably prepared by a controlled emulsion polymerization method because of poor water solubility.

As the emulsifier and dispersion stabilizer, publicly known arbitrary surfactants such as anionic, nonionic and cationic surfactants can be used. If necessary, mixtures thereof can be used and, in that case, an emulsifier having a large micelle-forming ability is preferably used in combination of an emulsifier having a small micelle-forming ability.

More preferably, the compound (II) or a salt thereof as an essential component in the present invention is used as the emulsifier during polymerization utilizing the emulsifiability thereof. Examples of the use thereof include a method of using as the emulsifier in the case of polymerizing to obtain a first acrylic rubber component, a method of using as the emulsifier in the case of polymerizing a monomer constituting a second acrylic rubber component in the presence of a first acrylic rubber component, or a method of using as the emulsifier in the case of graft-polymerizing the resulting polyalkyl (meth)acrylate composite rubber (A) with a vinyl monomer (B).

The particle size distribution of the polyalkyl (meth) acrylate composite rubber (A) is preferably a polydisperse distribution wherein at least one peak exists within a range from 0.05 to 0.4 $\mu$m and at least one peak exists within a range from 0.4 to 1.0 $\mu$m, respectively. Also the polyalkyl (meth)acrylate composite rubber (A) preferably comprises 50 to 99.9% by weight of particles having a particle diameter of 0.05 to 0.4 $\mu$m and 0.1 to 50% by weight of particles having a particle diameter of 0.4 to 1.0 $\mu$m. More preferably, the polyalkyl (meth)acrylate composite rubber comprises 70 to 99.9% by weight of particles having a particle diameter of 0.05 $\mu$m to 0.4 $\mu$m and 0.1 to 30% by weight of particles having a particle diameter of 0.4 to 1.0 $\mu$m.

As used herein, the particle size distribution refers to a weight distribution and the weight distribution refers to a distribution wherein the weight proportion of particles, which exist between microspaces within a range from certain particle diameter dp and (dp+$\Delta$dp), based on the entirety of the particles.

The use of the acrylic rubber graft copolymer (I) containing the polyalkyl (meth)acrylate composite rubber (A) having such a particle size distribution is preferred because the impact resistance of the resulting composition prepared by blending it with the resin is more improved as compared with the case of using a rubber, which does not have such a distribution.

Examples of the vinyl monomer (B), which is graft-polymerized with the polyalkyl (meth)acrylate composite rubber (A), include various vinyl monomers, for example, aromatic alkenyl compound such as styrene, a-methylstyrene or vinyl toluene; methacrylate ester such as methyl methacrylate or 2-ethylhexyl methacrylate; acrylate ester such as methyl acrylate, ethyl acrylate or n-butyl acrylate; and cyanated vinyl compound such as acrylonitrile or methacrylonitrile. These monomers may be used alone, or two or more kinds thereof may be used in combination. If necessary, crosslinking agents having two or more unsaturated bonds in a molecule, for example, ethylene glycol dimethacrylate, propylene glycol dimethacrylate, 1,3-butylene glycol dimethacrylate, 1,4-butylene glycol dimethacrylate, divinyl benzene, and silicone such as polyfunctional methacryl group-modified silicone; and graft crosslinking agents such as allyl methacrylate, triallyl cyanurate and triallyl isocyanurate may be added to the vinyl monomer (B) in the proportion of 20% by weight or less.

With respect to the proportion of the polyalkyl (meth) acrylate rubber (A) and that of the vinyl monomer (B) in the acrylic rubber graft copolymer (I), preferably, the proportion of the polyalkyl (meth)acrylate rubber is within a range from 60 to 99.9% by weight and the vinyl monomer (B) is within a range from 40 to 0.1% by weight. More preferably, the proportion of the polyalkyl (meth)acrylate rubber is within a range from 70 to 99.9% by weight and the proportion of the vinyl monomer (B) is within a range from 30 to 0.1% by weight. Still more preferably, the proportion of the polyalkyl (meth)acrylate rubber is within a range from 80 to 99.9% by weight and the proportion of the vinyl monomer (B) is within a range from 20 to 0.1% by weight. Most preferably, the proportion of the polyalkyl (meth)acrylate composite rubber (A) is within a range from 85 to 95% by weight and the proportion of the vinyl monomer (B) is within a range from 15 to 5% by weight.

When the proportion of the vinyl monomer (B) is less than 0.1% by weight, the dispersibility of the resulting acrylic rubber graft copolymer (I) in the resin is lowered and the processability of the resin composition obtained by blending the vinyl monomer is sometimes reduced. On the other hand, when the proportion exceeds 40% by weight, the impact resistance-manifesting effect of the acrylic rubber graft copolymer is sometimes reduced.

The acrylic rubber graft copolymer (I) is obtained by adding the vinyl monomer (B) to a latex of the polyalkyl (meth)acrylate composite rubber (A) and polymerizing the mixture in a single- or multi-stage by the radical polymerization. As described above, the compound (II) or salt thereof is preferably used as the emulsifier.

The acrylic rubber graft copolymer (I) is obtained in the form of particles by introducing this graft copolymer latex into hot water containing an acid such as sulfuric acid or hydrochloric acid or a metal salt such as calcium chloride, calcium acetate or magnesium sulfate dissolved therein, followed by salting-out, coagulation, separation and further recovery. At this time, a salt such as sodium carbonate or sodium sulfate may be used in combination. Also, it can be obtained by a direct drying method such as a spray drying method.

The impact strength modifier of the present invention further contains a compound (II), which has a sulfonic acid group or a sulfuric acid group and also has a benzene ring skeleton, or a salt thereof, in addition to the acrylic rubber graft copolymer (I). The compound (II) preferably has a sulfonic acid group and preferably has two or more benzene ring skeletons in a molecule. When using the compound having two or more benzene ring skeletons in a molecule, the thermal stability is improved when the resulting impact strength modifier is molded together with the thermoplastic resin.

The compound (II), which has a sulfonic acid group or a sulfuric acid group and also has a benzene ring skeleton, and salt thereof may be alkyl phenyl type or alkyl phenyl ether type and may have a polyoxylene chain as a nonion in a molecule.

Specific examples of the compound include straight-chain or branched alkylbenzenesulfonic acid and salt thereof, such as sodium dodecylbenzene sulfonate; polyoxyethylene alkyl phenyl ether sulfuric acid and salt thereof, such as sodium polyoxyethylene nonyl phenyl ether sulfate or sodium polyoxyethylene octyl phenyl ether sulfate; and diphenyl ether disulfonic acid and salt thereof, such as sodium alkyl diphenyl ether disulfonate (sodium alkyl phenoxybenzene sulfonate). Among these, alkyl diphenyl ether disulfonic acid salt such as sodium alkyl diphenyl ether disulfonate is used particularly preferably. These compounds can be used alone, or two or more kinds thereof can be used in combination.

The compound (II) or salt thereof is preferably blended with the impact strength modifier in the proportion within a range from 0.1 to 100000 ppm. When the proportion is less than 0.1 ppm or exceeds 100000 ppm the finally obtained thermoplastic resin composition is sometimes insufficient in impact resistance.

In the case in which the compound (II) or salt thereof has the emulsifiability, this compound is preferably used as the emulsifier, as described above. When it is used as the emulsifier, the proportion of the compound (II) or salt thereof in the impact strength modifier is preferably controlled by appropriately washing the acrylic rubber component or the acrylic rubber graft copolymer (I) as the polymerization product, or aggomerating them using a well-known coagulating agent and washing in the case of agglomerating and recovering them from the latex so that the proportion of the compound (II) or salt thereof in the impact strength modifier finally reaches a value within a range from 0.1 to 100000 ppm. When using the coagulating agent, a counter ion of the compound (II) sometimes becomes an ion different from an original one, which can be neglected.

As long as it contains the acrylic rubber graft copolymer (I) and the compound (II) or salt thereof, the impact strength modifier of the present invention may be obtained by preparing the acrylic rubber graft copolymer (I) and adding the compound (II) or salt thereto. Alternatively, the impact strength modifier may be obtained by adding the compound (II) or salt thereof, as the emulsifier, to the reaction system at a freely chosen stage in the preparation of the acrylic rubber graft copolymer (I), as described above.

When using the compound (II) or salt thereof as the emulsifier, it is used in a proportion within a range from 0.2 to 15 parts by weight, more preferably from 0.3 to 12 parts by weight, based on 100 parts by weight of the acrylic rubber graft copolymer (I). When the proportion is less than 0.2 parts by weight, the preparation of the acrylic rubber graft copolymer (I) may become unstable. On the other hand, when the proportion exceeds 15 parts by weight, it becomes impossible to control the particle diameter of the resulting impact strength modifier, and thus the impact resistance-manifesting effect of the finally obtained impact strength modifier may become insufficient.

The thermoplastic resin composition of the present invention is obtained by blending the resulting impact strength modifier with a thermoplastic resin. Specific examples of the thermoplastic resin include olefin resin such as polypropylene (PP) or polyethylene (PE); styrene resin (St resin) such as polystyrene (PS), high-impact polystyrene (HIPS), (meth) acrylate ester-styrene copolymer (MS), styrene-acrylonitrile copolymer (SAN), styrene-maleic anhydride copolymer (SMA), ABS, ASA or AES; acrylic resin (Ac resin) such as poly (methyl methacryalte) (PMMA); polycarbonate resin (PC resin); polyamide resin (PA resin); polyester resin (PEs resin) such as polyethylene terephthalate (PET) or polybutylene terephthalate (PBT); engineering plastics such as (modified) polyphenylene ether resin (PPE resin), polyoxyethylene resin (POM resin), polysulfone resin (PSO resin), polyarylate resin (PAr resin), polyphenylene sulfide resin (PPS resin) or thermoplastic polyurethane resin (PU resin); thermoplastic elastomer(TPE) such as styrene elastomer, olefin elastomer, vinyl chloride elastomer, urethane elastomer, polyester elastomer, polyamide elastomer, fluorine elastomer, 1,2-polybutadiene or trans 1,4-polyisoprene; polymer alloy, for example, PC resin/St resin alloy such as PC/ABS, PVC resin/St resin alloy such as PVC/ABS, PA resin/St resin alloy such as PA/ABS, PA resin/TPE alloy, PA resin/polyolefin resin alloy such as PA/PP, PC resin/PEs resin alloy such as PBT resin/TPE, PC/PBT, alloy of olefin resins such as polyolefin resin/TPE, PP/PE, PPE resin alloy such as PPE/HIPS, PPE/PBT or PPE/PA, or PVC resin/Ac resin alloy such as PVC/PMMA; and rigid, semi-rigid or non-rigid vinyl chloride resin. The impact strength modifier of the present invention is suited for use in a rigid vinyl chloride resin among these thermoplastic resins.

In the thermoplastic resin composition of the present invention, the impact strength modifier is preferably blended in the amount within a range from 0.1 to 30 parts by weight, and more preferably from 1 to 20 parts by weight, based on 100 parts by weight of the thermoplastic resin.

As long as physical properties are not impaired, conventional stabilizers and fillers can be added to the thermoplastic resin composition of the present invention during compounding, kneading or molding of the resin according to the purposes.

Examples of the stabilizers include lead stabilizers such as tribasic lead sulfate, dibasic lead phosphite, basic lead sulfite or lead silicate; metal soap stabilizers derived from metals such as potassium, magnesium, barium, zinc, cadmium or lead and fatty acid such as 2-ethylhexanoic acid, lauric acid, myristic acid, palmitic acid, stearic acid, isostearic acid, hydroxystearic acid, oleic acid, ricinoleic acid, linoleic acid or behenic acid; organotin stabilizers derived from an alkyl group or an ester group and fatty acid salt, maleic acid salt or sulfide-containing substance; complex metal soap stabilizers such as Ba—Zn, Ca—Zn, Ba—Ca—Sn, Ca—Mg—Sn, Ca—Zn—Sn, Pb—Sn or Pb—Ba—Ca stabilizer; metal salt stabilizers derived from a metal group of barium or zinc and two or more organic acids, for example, branched fatty acid such as 2-ethylhexanoic acid, isodecanoic acid or tri alkyl acetic acid, unsaturated fatty acid such as oleic acid, ricinoleic acid or linoleic acid, alicyclic acid such as naphthenic acid, and aromatic acid such as carbolic acid, benzoic acid, salicylic acid or substituted derivative thereof; metal stabilizer such as metal salt liquid stabilizer obtained by dissolving these stabilizers in an organic solvent such as petroleum hydrocarbon, alcohol or glycerin derivative, and blending auxiliary stabilizers such as phosphite ester, epoxy compound, color development inhibitor, transparency modifier, photostabilizer, antioxidant, plate-out inhibitor or lubricant; epoxy compound such as epoxy resin, epoxidated soybean oil, epoxidated vegetable oil or epoxidated fatty acid alkyl ester; organic phosphite ester wherein phosphorus having at least one substituent of an alkyl group, an aryl group, a cycloalkyl group or an alkoxyl group and containing a dihydric alcohol such as propylene glycol and an aromatic compound such as hydroquinone or bisphenool A; ultraviolet absorber, for example, hindered phenol such as BHT or bispheol dimerized by sulfur or a methylene group, salicylate ester, benzophenone or benzotriazole; photostabilizer such as hindered amine or nickel complex salt; ultraviolet screening agent such as carbon black or rutile type titanium oxide; polyhydric alcohol such as trimethylolpropane, pentaerythritol, sorbitol or mannitol; nitrogen-containing compound such as β-aminocrotonate, 2-phenylindole, diphenylthio urea or dicyandiamide; sulfur-containing compound such as dialkylthiodipropionate ester; keto compound such as acetoacetate, dehydroacetic acid or β-diketone; and non-metallic stabilizer such as organosilicon compound or borate ester. These stabilizers are used alone, or two or more kinds thereof may be used in combination.

Examples of the filler include carbonate such as ground calcium carbonate, precipitated calcium carbonate or colloidal calcium carbonate; inorganic filler such as titanium oxide, clay, talc, mica, silica, carbon black, graphite, glass beads, glass fiber, carbon fiber or metal fiber; organic filler such as organic fiber of polyamide, or silicone; and natural organic matter such as wood flour.

In addition, there can be added impact strength modifiers such as MBS, ABS, AES, NBR, EVA, chlorinated polyethylene, acrylic rubber, polyalkyl (meth)acrylate rubber graft copolymer and thermoplastic elastomer; processing aids such as (meth)acrylate ester copolymer; alkyl esters of aromatic polybasic acid, such as dibutyl phthalate, dioctyl phthalate, diisodecyl phthalate, diisononyl phthalate, diundecyl phthalate, trioctyl trimellitate, triisooctyl trimellitate or pyrromellitate, and alkyl esters of aliphatic polybasic acid, such as dibutyl adipate, dioctyl adipate, dithiononyl adipate, dibutyl azelate, dioctyl azelate or diisononyl azelate; phosphate esters such as tricresyl phosphate; polyester plasticizer obtained by blocking a terminal end of a polycondensate having a molecular weight of about 600 to 8,000 of a polyhydric carboxylic acid such as adipic acid, azelaic acid, sebacic acid or phthalic acid and a polyhydric alcohol such as ethylene glycol, 1,2-propylene glycol, 1,2-butylene glycol, 1,3-butylene glycol or 1,4-butylene glycol using a monohydric alcohol or a monohydric carboxylic acid; epoxy plasticizers such as epoxidated soybean oil, epoxidated linseed oil and epoxidated tall oil fatty acid-2-ethylbexyl; plasticizers such as chlorinated paraffin; pure hydrocarbons such as liquid paraffin or low-molecular weight polyethylene; fatty acids such as halogenated hydrocarbon, higher fatty acid and oxy-fatty acid and fatty acid amides such as fatty acid amide; polyhydric alcohol ester of fatty acid such as glyceride, fatty alcohol ester (ester wax) of fatty acid, metal soap, fatty alcohol, polyhydric alcohol, polyglycol, polyglycerol, esters such as partial ester of fatty acid and polyhydric alcohol, partial ester of fatty acid and polyglycol or polyglycerol; lubricants such as (meth)acrylate ester copolymer; flame retardants such as chlorinated paraffin, aluminum hydroxide, antimony trioxide and halogen compound; heat resistance modifiers such as (meth)acrylate ester copolymer, imide copolymer or styrene-acrylonitrile copolymer; releasants; crystal nucleators; fluidity modifiers; colorants; antistatic agents; conductivity imparting agents; surfactant; anti-fogging agents; blowing agents; and anti-bacterial agents.

In the present invention, the method of preparing the thermoplastic resin composition by blending the impact strength modifier with the thermoplastic resin is not specifically limited, and a conventional method can be used. Preferably, the thermoplastic resin composition is prepared by a melt-mixing method. If necessary, a small amount of a solvent may be used. Examples of usable apparatus include extruders, Banbury mixers, rollers and kneaders and these apparatuses are operated batch-wise or continuously. The mixing order of the components is not specifically limited. The application of the resulting thermoplastic resin composition is not limited and, for example, it can be widely used in building materials, automobiles, toys, general merchandise such as stationery, and molded articles requiring impact resistance for OA equipment and appliances.

EXAMPLES

The following Examples and Comparative Examples further illustrate the present invention in detail. In the descriptions, "parts" and "percentages" are "by weight" unless otherwise specified.

Preparation Example 1

Preparation of Impact Strength Modifier (1)

99.5 Parts of 2-ethylhexyl acrylate and 0.5 parts of allyl methacrylate were mixed to obtain 100 parts of a (meth)acrylate monomer mixture. 100 Parts of the (meth)acrylate monomer mixture was added to a solution prepared by dissolving 1 part (solid content) of Pelex SS-H®, which is commercially available from Kao Corp. as a sodium alkyl diphenyl ether disulfonate, in 195 parts of distilled water and, after previously stirring at 10,000 rpm using a homomixer, the mixed solution was emulsified and dispersed at a pressure of 300 kg/cm$^2$ using a homogenizer to obtain a (meth)acrylate emulsion.

The resulting mixed solution was transferred to a separable flask equipped with a condenser and a stirring blade, and heated while mixing with stirring after replacing the atmosphere in the flask with nitrogen. Upon reaching 50° C., 0.5 parts of tert-butyl hydroperoxide was added and, after heating to 50° C., 0.002 parts of ferrous sulfate, 0.006 parts of disodium ethylenediamine tetraacetate, 0.26 parts of Rongalite and 5 parts of distilled water were introduced into the mixed solution. The polymerization was completed by allowing the mixed solution to stand for 5 hours to obtain an acrylic rubber (A1) component latex.

The polymerization degree of the resulting acrylic rubber (A1) component latex was 99.9%. This latex was agglomerated with ethanol and dried to obtain a solid, followed by extraction with toluene at 90° C. for 12 hours and the measurement of the gel content. As a result, it was 93.7%. Furthermore, 7.0 parts of Pelex SS-H as the solid was added to the latex.

The acrylic rubber (A1) component latex was collected so that the solid content of poly 2-ethylhexyl acrylate containing allyl methacrylate became 10 parts and was charged in a separation flask equipped with a stirrer, and then distilled water was added so that the amount of distilled water in the system was 195 parts. At this time, Pelex SS-H exists in the latex as the solid content of 0.8 parts.

Then, a mixed solution of 78 parts of n-butyl acrylate containing 2.0% of allyl methacrylate constituting the acrylic rubber (A2) component and 0.32 parts of tert-butyl hydroperoxide was charged and stirred for 10 minutes, thereby impregnating the acrylic rubber (A1) component particles with the mixed solution. After stirring for an additional 10 minutes, the atmosphere in the system was replaced by nitrogen and the temperature in the system was raised to 50° C. Then, a mixed solution of 0.002 parts of ferrous sulfate, 0.006 parts of disodium ethylenediamine tetraacetate, 0.26 parts of Rongalite and 5 parts of distilled water was charged and the radical polymerization was initiated. The polymerization was completed by standing at an interior temperature of 70° C. for 2 hours to obtain a polyalkyl (meth)acrylate composite rubber latex comprising an acrylic rubber (A1) component and an acrylic rubber (A2) component.

A portion of the latex was collected and used to measure a particle size distribution of the polyalkyl (meth)acrylate composite rubber. The measurement results of the particle size distribution are shown in Table 2. This latex was dried to obtain a solid, followed by extraction with toluene at 90° C. for 12 hours and further measurement of the gel content. As a result, it was 98.3%.

In the polyalkyl (meth)acrylate composite rubber latex, a mixed solution of 0.06 parts of tert-butyl hydroperoxide and 12 parts of methyl methacrylate was added dropwise at 70° C. over 15 minutes and the graft polymerization to the polyalkyl (meth)acrylate composite rubber was completed by standing at 70° C. for 4 hours. The polymerization degree of methyl methacrylate was 99.4%.

The resulting acrylic rubber graft copolymer latex was added dropwise in 200 parts of hot water containing 1.5% by weight of aluminum sulfate, followed by coagulation, separation, washing and drying at 75° C. for 16 hours to prepare a powdered acrylic rubber graft copolymer (1), which was used as an impact strength modifier (1). Also the glass transition temperature of the acrylic rubber graft copolymer (1) was measured. The measured glass transition temperature is a value originating in the polyalkyl (meth) acrylate composite rubber. The results are shown in Table 2.

The above blending components are summarized in Table 1.

The measurement of the particle size distribution, the measurement of the glass transition temperature and the measurement of the amount of the compound (II) or salt thereof in the impact strength modifier were carried out in the following procedures. The measurement results are shown in Table 2.

Measurement of particle size distribution of polyalkyl (meth)acrylate composite rubber Using samples obtained by diluting the resulting latex with distilled water, the measurement was carried out by a size distribution meter, Model CHDF2000, manufactured by MATEC USA Inc. The measurement was carried out under standard conditions recommended by MATEC USA Inc. Using a special-purpose capillary cartridge and a nearly neutral carrier solution, 0.1 ml of a dilute latex sample having a concentration of about 3% was measured under the conditions of a flow rate of 1.4 ml/min, a pressure of about 4000 psi and a temperature of 35° C. As a substance having a standard particle diameter, 12 monodisperse polystyrene samples having a particle diameter within a range from 0.02 to 0.8 μm manufactured by MATEC USA Inc. were used.

Measurement of glass transition temperature of acrylic rubber graft copolymer.

70 parts of the resulting acrylic rubber graft copolymer (I) and 30 parts of poly (methyl methacrylate) (PMMA) were pelletized by a 25 mm diameter single-screw extruder at 250° C., formed into a plate having a thickness of 3 mm using a press maintained at 200° C. and was then cut into samples of 10 mm in width and 12 mm in length. Then, the measurement was carried out by a tester, Model DMA983, manufactured by TA Instruments Inc. under the conditions of a heating rate of 2° C./min and the temperature corresponding to the resulting tan d curve was taken as the glass transition temperature.

Measurement of amount of compound (II) or salt thereof in impact strength modifier Since the impact strength modifier recovered by salt-coagulation in the form of powders is washed after solid-liquid phase separation, a portion of the compound (II) or salt thereof may be released out of the system of the copolymer. Therefore, the amount was determined in the following procedure.

The weighed sample was dissolved and dispersed in chloroform and extracted with an about 10-fold amount of methanol, and then the methanol layer was concentrated. It was concentrated again after washing with methanol.

To the sample thus concentrated, 100 ml of pure water was added and extraction was carried out with heating at 70° C. for 24 hours. After cooling to room temperature and filtering, the filtrate was concentrated by drying and was weighed.

The resulting water extract was measured by using HPLC and FT-IR, and identification and determination of the component were carried out.

Measuring conditions of HPLC are as follows.

Column: ODS (Zorbax-ODS of 4.6 mm in diameter and 150 mm in length)
Measuring temperature: 40° C.
Eluent: acetonitrile/DIW=10/90, changed to 100/0 after 20 minutes (1.0 ml/min)
Detector: DAD (250 nm)

The amount of the compound of the compound (II) or salt thereof in the strength modifier measured in accordance with the procedure described above is shown in Table 2.

Preparation Examples 2 to 3

Preparation of Impact Strength Modifiers (2) to (3)

In Preparation Example 2, the initial charge amount of the sodium alkyl diphenyl ether disulfonate (Kao Corp.: Pelex SS-H®) was set to 0.9 parts. In Preparation Example 3, the initial charge amount was set to 0.8 parts. The amounts were finally controlled to the amounts shown in Table 1 by further addition. In the same manner as in Preparation Example 1, except that the weight ratio of the A1 component to the A2 component was set to the ratio shown in Table 1, acrylic rubber graft copolymers (2) and (3) were prepared and used as impact strength modifiers (2) and (3).

In the same manner as in Preparation Example 1, the measurement of the particle size distribution of the polyalkyl (meth)acrylate composite rubber, the measurement of the glass transition temperature of the acrylic rubber graft copolymers (2) and (3) and the measurement of the amount of the compound (II) or salt thereof in the impact strength modifier were carried out. The results are shown in Table 2. The particle size distribution on a weight basis of the polyalkyl (meth)acrylate composite rubber prepared in Preparation Example 2 is shown in FIG. 1.

Preparation Example 4

Preparation of Impact Strength Modifier (4)

In Preparation Example 1, the initial charge amount of sodium dodecylbenzene sulfonate (DBSNa) as the emulsifier was set to 1 part and the amount was finally controlled to the amount shown in Table 1 by further addition. In the same manner as in Preparation Example 1, except that the weight ratio of the A1 component to the A2 component was set to the ratio shown in Table 1, an acrylic rubber graft copolymer (4) was prepared and used as an impact strength modifier (4).

In the same manner as in Preparation Example 1, the measurement of the particle size distribution of the polyalkyl (meth)acrylate composite rubber, the measurement of the glass transition temperature of the acrylic rubber graft copolymer (4) and the measurement of the amount of the compound (II) or salt thereof in the impact strength modifier were carried out. The results are shown in Table 2.

Preparation Example 5

Preparation of Impact Strength Modifier (5)

In a separation flask equipped with a stirrer, 295 parts of distilled water and 1.0 parts of potassium beef-talloate were charged and, furthermore, 0.4 parts of boric acid and 0.04 parts of anhydrous sodium carbonate were added. After stirring for 10 minutes and replacing the atmosphere in the flask by nitrogen, the temperature was raised to 50° C. and a mixed solution of 83.3 parts of n-butyl acrylate, 1.7 parts of allyl methacrylate and 0.4 parts of tert-butyl hydroperoxide was charged. Then, polyorganosiloxane particles were impregnated in the mixed solution by stirring for 30 minutes. Then, a mixed solution of 0.002 parts of ferrous sulfate, 0.006 parts of disodium ethylenediamine tetraacetate, 0.26 parts of Rongalite and 5 parts of distilled water was charged and the radical polymerization was initiated. The polymerization was completed by standing at an interior temperature of 70° C. for 2 hours to obtain a polyalkyl (meth)acrylate composite rubber latex comprising only an acrylic rubber (A2) component. A portion of the latex was collected and the particle size distribution of the polyalkyl (meth)acrylate rubber was measured in the same manner as in Preparation Example 1. As a result, the polyalkyl (meth)acrylate rubber exhibited a monodisperse distribution with a peak at 0.22 μm. This latex was dried to obtain a solid, followed by extraction with toluene at 90° C. for 12 hours and further measurement of the gel content. As a result, it was 97.3%.

In the polyalkyl (meth)acrylate rubber latex, a mixed solution of 0.06 parts of tert-butyl hydroperoxide and 15 parts of methyl methacrylate was added dropwise at 70° C. over 15 minutes and the graft polymerization of the methyl methacrylate to the polyalkyl (meth)acrylate rubber was completed by standing at 70° C. for 4 hours.

The polymerization degree of methyl methacrylate was 97.2%. The resulting graft copolymer latex was added dropwise in 200 parts of hot water containing 1.0% by weight of aluminum sulfate, followed by coagulation, separation, washing and drying at 75° C. for 16 hours to prepare a powdered acrylic rubber graft copolymer (5), which was used as an impact strength modifier (5).

In the same manner as in Preparation Example 1, the glass transition temperature of the acrylic rubber graft copolymer (5) was measured. The results are shown in Table 2. The above blending components are summarized in Table 1.

TABLE 1

| | Impact strength modifier | | | | | | | |
|---|---|---|---|---|---|---|---|---|
| | Acrylic rubber graft copolymer (I) | | | | | | | |
| | Composition of component A1 | | Composition of component A2 | | | Component A/ Component B | | |
| Preparation Example No. | 2EHA (wt %) | AMA (wt %) | BA (wt %) | AMA (wt %) | A1/A2 (weight ratio) | (weight ratio upon graft polymerization) | Compound (II) or salt thereof | |
| Preparation Example 1 | 99.5 | 0.5 | 98 | 2 | 10/78 | 88/12 | Pelex SS-H | 0.8 |
| Preparation Example 2 | 99.5 | 0.5 | 98 | 2 | 20/68 | 88/12 | Pelex SS-H | 1.0 |
| Preparation Example 3 | 99.5 | 0.5 | 98 | 2 | 30/58 | 88/12 | Pelex SS-H | 1.0 |
| Preparation Example 4 | 99.5 | 0.5 | 98 | 2 | 20/68 | 88/12 | DBSNa | 1.0 |
| Preparation Example 5 | — | — | 98 | 2 | 0/85 | 85/15 | Potassium beef-talloate | 1 |

Abbreviations in Table 1 are as follows.
2EHA: 2-ethylhexyl acrylate
AMA: allyl methacrylate
BA: n-butyl acrylate
Component B: vinyl monomer
DBSNa: sodium dodecylbenzenesulfonate

TABLE 2

| | Impact strength modifier | | | Particle size distribution of polyalkyl (meth)acrylate composite rubber | | | Compound (II) or salt |
|---|---|---|---|---|---|---|---|
| | Kind of | Glass transition temperature Tg (° C.) | | | | Proportion of particles having | thereof Amount in |
| | impact strength modifier | Tg originating in component A1 | Tg originating in component A2 | Distribution state | Peak position (μm) | a particle diameter of 0.05 to 0.4 μm (wt %) | impact strength modifier (ppm) |
| Preparation Example 1 | (1) | −55 | −28 | polydisperse | 0.20 0.70 | >90 | 550 |
| Preparation Example 2 | (2) | −55 | −28 | polydisperse | 0.21 0.70 | >90 | 610 |

TABLE 2-continued

| | Impact strength modifier | | | Particle size distribution of polyalkyl (meth)acrylate composite rubber | | | Compound (II) or salt thereof Amount in |
|---|---|---|---|---|---|---|---|
| | Kind of impact strength modifier | Glass transition temperature Tg (° C.) | | Distribution state | Peak position (μm) | Proportion of particles having a particle diameter of 0.05 to 0.4 μm (wt %) | impact strength modifier (ppm) |
| | | Tg originating in component A1 | Tg originating in component A2 | | | | |
| Preparation Example 3 | (3) | −55 | −28 | polydisperse | 0.21 0.65 | >90 | 700 |
| Preparation Example 4 | (4) | −55 | −28 | polydisperse | 0.20 0.10 | — | 500 |
| Preparation Example 5 | (5) | — | −28 | monodisperse | 0.21 | — | — |

Examples 1 to 3

The impact strength modifiers (1) to (3) obtained in the above Preparation Examples 1 to 3 were blended with a rigid vinyl chloride resin to prepare vinyl chloride resin compositions. The impact resistance and the weatherability of the resulting vinyl chloride resin compositions were evaluated in the following procedures.

The results are shown in Table 3.

Impact resistance: The impact resistance was evaluated by Izod impact resistance. In accordance with the following two kinds of formulations (formulations A and B), vinyl chloride resin compositions were prepared and formed into ½"×¼" square bars using a 25 mm diameter single-screw extruder maintained at 190° C., and then evaluation was carried out by the method defined in ASTM D256. The vinyl chloride resin composition with the formulation A was measured at 23° C., while the vinyl chloride resin composition with the formulation B was measured at 0° C. The results are shown in the column of measurement A and measurement B in the table, respectively.

| Formulation A: | |
|---|---|
| Vinyl chloride resin (polymerization degree: 700) | 100 parts |
| Dibutyltin maleate | 3.5 parts |
| Stearyl alcohol | 0.8 parts |
| Processing aid Metablen P-700 | 0.4 parts |
| Carbon black | 0.5 parts |
| Modifier | 7.5 parts |
| Formulation B: | |
| Vinyl chloride resin (polymerization degree: 1100) | 100 parts |
| Dibasic lead phosphite | 2.5 parts |
| Dibasic lead stearate | 0.7 parts |
| Lead stearate | 0.5 parts |
| Calcium stearate | 0.9 parts |
| Polyethylene wax (molecular weight: 2200) | 0.1 parts |
| Calcium carbonate | 5.0 parts |
| Processing aid (Metablen P-501) | 1.0 parts |
| Carbon black | 0.5 parts |
| Modifier | 7.5 parts |

Weatherability: In accordance with the formulation B, a vinyl chloride resin composition was prepared, was kneaded at 200° C. and 15 rpm for 5 minutes using a 6 inch test roller manufactured by Kansai Roll, Ltd., charged in a mold maintained at 200° C. for 6 minutes and then cooled while applying a pressure of 50 kg/cm² to obtain a specimen sheet. The operation of subjecting the specimen sheet to an Eye Super UV tester manufactured by DAINIPPON PLASTICS CO., LTD. maintained at 60° C. for 8 hours and allowing the specimen to stand in a thermohygrostat maintained at a temperature of 60° C. and a humidity of 95% for 16 hours was repeated five times, and then the appearance of the specimen sheet was visually evaluated.

In Table 3, the symbol "◯" denotes good fading resistance, while the symbol "×" denotes poor fading resistance.

Thermal stability: In accordance with the formulation (white), excluding carbon black from the formulation A, a vinyl chloride resin composition was prepared, kneaded at 200° C. and 15 rpm for 5 minutes using a 6 inch test roller, charged in a mold maintained at 200° C. for 6 minutes and then cooled while applying a pressure of 50 kg/cm² to obtain a specimen sheet. The specimen sheet was heated in a Geer oven maintained at 180° C. for 30 minutes and then the thermal stability was evaluated by the coloration of the appearance. The color of a specimen sheet having poor thermal stability was dark brown. In Table 3, the order of the symbols "◯", "Δ", "×" and "× ×" indicates worsening thermal stability.

Comparative Examples 1, 2 and 3

In the same manner as in Example 1, except for using, as an impact strength modifier, the acrylic rubber graft copolymer (4) in Comparative Example 1, an acrylic rubber graft copolymer (5) in Comparative Example 2 or a MBS modifier (Metablen C-223 (trade name), manufactured by Mitsubishi Rayon Co., Ltd.) in Comparative Example 3, each impact strength modifier was blended with a vinyl chloride resin to prepare vinyl chloride resin compositions.

In the same manner as in Example 1, the impact resistance, the weatherability and the thermal stability of the resulting vinyl chloride resin compositions were evaluated. The results are shown in Table 3.

TABLE 3

| | Physical properties of vinyl chloride resin composition | | | |
|---|---|---|---|---|
| | Weatherability | Thermal stability Thermal | Impact resistance (J/m) | |
| | Color fastness | discoloration resistance | Measurement A (23° C.) | Measurement B (0° C.) |
| Example 1 | ◯ | ◯ | 1100 | 195 |
| Example 2 | ◯ | ◯ | 1020 | 230 |
| Example 3 | ◯ | ◯ | 1010 | 310 |

TABLE 3-continued

| | Physical properties of vinyl chloride resin composition | | | |
|---|---|---|---|---|
| | Weather-ability | Thermal stability | Impact resistance (J/m) | |
| | Color fastness | Thermal discoloration resistance | Measurement A (23° C.) | Measurement B (0° C.) |
| Comparative Example 1 | ○ | ○ | 700 | 170 |
| Comparative Example 2 | ○ | ? | 120 | 40 |
| Comparative Example 3 | ? | ? ? | 1100 | 350 |

Examples 4 to 8

The impact strength modifiers (1) to (3) obtained in Preparation Example 1 to 3 were blended with the following thermoplastic resin in accordance with the combinations and parts shown in Table 4. After mixing in a Henschel mixer for 4 minutes, the mixture was melt-kneaded at a cylinder temperature of 260° C. in a 30 mm diameter twin-screw extruder and was pelletized to obtain resin compositions.

The molded articles of the respective resin compositions had good appearance.

Also ¼ inch Izod test specimens were obtained by injection molding. Using these test specimens, impact resistance was evaluated by the following procedure. The results are shown in Table 5.

Then, the operation of subjecting the specimens to an Eye Super UV tester manufactured by DAINIPPON PLASTICS CO., LTD. maintained at 60° C. for 8 hours and allowing the specimens to stand in a thermohygrostat maintained at a temperature of 60° C. and a humidity of 95% for 16 hours was repeated five times, and then the impact resistance of the specimen was visually evaluated and the impact resistance after the weathering test was evaluated. These results are also shown in Table 5.

Izod impact strength was evaluated by the method defined in ASTM D256.

Comparative Example 4

In the same manner as in Example 4, except that MBS (Metablen C-223) manufactured by Mitsubishi Rayon Co., Ltd.) was used as the impact strength modifier, a resin composition shown in Table 4 was obtained. The resulting resin composition was evaluated in the same manner as in Example 4. The results are shown in Table 5.

The following resins were used as the thermoplastic resin.

Polycarbonate resin: bisphenol A type polycarbonate having a viscosity-average molecular weight of about 22000 (represented by PC in Table 4)

Polyester resin: polytetramethylene terephthalate intrinsic viscosity [η] of 1.05 (represented by PBT in Table 4)

Polyphenylene ether resin: poly(2,6-dimethyl-1,4-phehylene) ether (manufactured by GE Plastics Japan Co., Ltd.), intrinsic viscosity (chloroform, 25° C.)0.48 dl/g) (represented by PPE in Table 4)

Polystyrene resin: Toborex 876-HF (high-impact polystyrene manufactured by Mitsui Chemicals (represented by HIPS in Table 4)

ABS resin: Diapet 3001 manufactured by Mitsubishi Rayon, Ltd. (represented by ABS in Table 4)

SAN resin: SR30B manufactured by Ube Saikon Co., Ltd. (represented by SAN in Table 4)

PPS resin: Topren PPS manufactured by Tonen Kagaku Inc. (represented by PPS in Table 4)

TABLE 4

| | Thermoplastic resin composition | | | | | | | | |
|---|---|---|---|---|---|---|---|---|---|
| Example No. | Kind and Parts of thermoplastic resin | | | | | | | Impact strength modifier | |
| | PC | PBT | ABS | SAN | PPE | HIPS | PPS | Kind | Parts |
| Example 4 | 41 | 59 | — | — | — | — | — | (2) | 18 |
| Example 5 | 100 | — | — | — | — | — | — | (2) | 3 |
| Example 6 | — | — | — | — | 40 | 60 | — | (1) | 3 |
| Example 7 | 76 | — | 10 | 14 | — | — | — | (2) | 3 |
| Example 8 | — | — | — | — | — | — | 100 | (3) | 14 |
| Comparative Example 4 | 41 | 59 | — | — | — | — | — | MBS | 18 |

TABLE 5

| | Izod impact strength of thermoplastic resin composition (J/m) | | |
|---|---|---|---|
| | Before weathering test | | After weathering test |
| Example No. | 23° C. | −10° C. | 23° C. |
| Example 4 | 770 | 140 | 750 |
| Example 5 | 600 | 130 | 580 |
| Example 6 | 210 | 80 | 200 |
| Example 7 | 700 | 120 | 690 |
| Example 8 | 210 | 80 | 200 |
| Comparative Example 4 | 550 | 100 | 120 |

As shown in Table 3 and Table 5, all thermoplastic resin compositions obtained by blending the impact strength modifiers (1) to (3) prepared in Preparation Examples (1) to (3) with the resin were superior in impact resistance and also superior in impact resistance at low temperature. They were also superior in weatherability and thermal stability.

As is apparent from FIG. 1, in the particle size distribution (weight distribution) of the polyacryl (meth)acrylate composite rubber of Preparation Example 2, a peak exists at 0.2 μm and 0.7 μm and 90% by weight or more of the entire weight of the component constituting the polyalkyl (meth) acrylate rubber has a particle diameter within a range from 0.05 to 0.4 μm. Although the graph is omitted, the particle size distribution of the polyalkyl (meth)acrylate composite rubbers prepared in Preparation Examples 1 and 3 exhibited almost the same polydisperse distribution.

All impact strength modifiers (1) to (3) has the glass transition temperature Tg1 originating in the A1 component and the glass transition temperature Tg2 originating in the A2 component, and Tg1 is lower than Tg2 and both of them were lower than 10° C.

Industrial Applicability

As described above, when using a small amount of the impact strength modifier of the present invention, the impact resistance, particularly low-temperature impact resistance of the resin, can be improved, and weatherability such as fading resistance or impact resistance of the resulting molded article can be satisfactorily maintained. Therefore, the thermoplastic resin composition blended with the impact strength modifier of the present invention is superior in both impact resistance and weatherability.

The present invention may be embodied in other specific forms without departing from the spirit or essential characteristics thereof. The present embodiment is therefore to be construed in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. An impact strength modifier, comprising:
   i) an acrylic rubber graft copolymer (I) prepared by graft-polymerizing a vinyl monomer (B) onto a polyalkyl (meth)acrylate composite rubber (A) that contains two or more acrylic rubber components each having a different glass transition temperature, and each acrylic rubber component of the composite rubber being comprised of 20% by weight or less of monomer units having two or more unsaturated bonds in a molecule, and
   ii) a compound (II) which has a sulfonic acid group or a sulfuric acid group, each acid group optionally being in salt form, and is comprised of two or more benzene ring structures.

2. An impact strength modifier, comprising:
   i) an acrylic rubber graft copolymer (I) prepared by graft-polymerizing a vinyl monomer (B) onto a polyalkyl (meth)acrylate composite rubber (A) that contains two or more acrylic rubber components each having a different glass transition temperature, and each acrylic rubber component of the composite rubber being comprised of 20% by weight or less of monomer units having two or more unsaturated bonds in a molecule, and
   ii) a compound (II) which has a sulfonic acid group or a sulfuric acid group, each acid group optionally being in salt form, and is comprised of one or more benzene ring structures, wherein the polyalkyl (meth)acrylate composite rubber (A) has a particle size distribution that is a polydisperse distribution in which at least one peak exists within the range of 0.05 to 0.4 μm and has a weight percentage within the range from 50 to 99.9% by weight, and at least one peak exists within the range of 0.4 to 1.0 μm and has a weight percentage within the range from 0.1 to 50% by weight.

3. The impact strength modifier according to claim 1 or 2, wherein the acrylic rubber graft copolymer (I) is prepared by graft-polymerizing 40 to 0.1% by weight of the vinyl monomer (B) onto 60 to 99.9% by weight of the polyalkyl (meth)acrylate composite rubber (A).

4. The impact strength modifier according to claim 3, wherein the acrylic rubber graft copolymer (I) is prepared by graft-polymerizing 30 to 0.1% by weight of the vinyl monomer (B) onto 70 to 99.9% by weight of the polyalkyl (meth)acrylate composite rubber (A).

5. The impact strength modifier according to claim 1 or 2, wherein the polyalkyl (meth)acrylate composite rubber (A) has two or more glass transition temperatures at 10° C. or less.

6. The impact strength modifier according to claim 1 or 2, wherein the polyalkyl (meth)acrylate composite rubber (A) has two or more glass transition temperatures and at least one glass transition temperature is lower than the glass transition temperature of an n-butyl acrylate homopolymer.

7. The impact strength modifier according to claim 1 or 2, wherein the polyalkyl (meth)acrylate composite rubber (A) comprises an acrylic rubber (A1) component comprised of at least one acrylic rubber selected from the group consisting of 2-ethylhexyl acrylate, ethoxyethoxyethyl acrylate, methoxy tripropylene glycol acrylate, 4-hydroxybutyl acrylate, lauryl methacrylate and stearyl methacrylate as a constituent component and an acrylic rubber (A2) component comprised of n-butyl acrylate as a constituent component, the glass transition temperature (Tg1) of the acrylic rubber (A1) component being less than the glass transition temperature (Tg2) of the acrylic rubber (A2) component.

8. The impact strength modifier according to claim 1 or 2, wherein compound (II) is an alkylbenzenesulfonic acid or salt thereof, a polyoxyethylene alkyl phenyl ether sulfuric acid or salt thereof or diphenyl ether disulfonic acid or salt thereof.

9. The impact strength modifier according to claim 1 or 2, wherein compound (II) is blended into the other components of the impact modifier in a concentration ranging from 0.1 to 100000 ppm.

10. The impact strength modifier according to claim 1 or 2, wherein, when compound (II) is employed as the emulsifier of the polymerization, it is present in the composition in an amount ranging from 0.2 to 15 parts by weight based on 100 parts by weight of the acrylic rubber graft copolymer (I).

11. A method of preparing the impact strength modifier of claim 1 or 2, which comprises:
   preparing an acrylic rubber graft copolymer (I) by graft-polymerizing said vinyl monomer (B) onto said polyalkyl (meth)acrylate composite rubber (A) in the presence of said compound (II) or a salt thereof as an emulsifier in an emulsion polymerization process.

12. The method of preparing the impact strength modifier according to claim 11, wherein the acrylic rubber (A1) is prepared by controlled emulsion polymerization of a monomer formulation containing at least one monomer selected from the group consisting of 2-ethylhexyl acrylate, ethoxyethoxyethyl acrylate, methoxy tripropylene glycol acrylate, 4-hydroxybutyl acrylate, lauryl methacrylate and stearyl methacrylate, wherein the prepared acrylic rubber (A1) component is incorporated as a component of the polyalkyl (meth)acrylate composite rubber (A).

13. A thermoplastic resin composition comprising the impact strength modifier of claim 1 or 2 and a thermoplastic resin.

14. The thermoplastic resin composition according to claim 13, wherein the thermoplastic resin is an olefin resin, a styrene resin, an acrylic resin, a polycarbonate resin, a polyamide resin, a polyester resin, an engineering plastic, a polyoxyethylene resin, a polysulfone resin, a polyarylate resin, a polyphenylene sulfide resin, a thermoplastic polyurethane resin, a styrene elastomer, an olefin elastomer, a vinyl chloride elastomer, a urethane elastomer, a polyester elastomer, a polyamide elastomer, a fluorine elastomer, 1,2-polybutadiene or trans 1,4-polyisoprene or a polymer alloy.

15. The thermoplastic resin composition according to claim 14, wherein the thermoplastic resin is a rigid vinyl chloride resin.

16. The thermoplastic resin composition according to claim 13, wherein the impact strength modifier is blended into the composition in an amount of 0.1 to 30 parts by weight, based on 100 parts by weight of the thermoplastic resin component.

17. An impact strength modifier, comprising:
   i) an acrylic rubber graft copolymer (I) prepared by graft-polymerizing a vinyl monomer (B) onto a polyalkyl (meth)acrylate composite rubber (A) that contains two or more acrylic rubber components each having a different glass transition temperature, and each acrylic rubber component of the composite rubber being comprised of 20% by weight or less of monomer units having two or more unsaturated bonds in a molecule, and
   ii) a compound (II) which has a sulfonic acid group or a sulfuric acid group, each acid group optionally being in salt form, and is comprised of two or more benzene ring structures, wherein the polyalkyl (meth)acrylate composite rubber (A) has a particle size distribution that is a polydisperse distribution in which at least one peak exists within the range of 0.05 to 0.4 $\mu$m and has a weight percentage within the range from 50 to 99.9% by weight, and at least one peak exists within the range of 0.4 to 1.0 $\mu$m and has a weight percentage within the range from 0.1 to 50% by weight.

* * * * *